United States Patent [19]

Shallenberger et al.

[11] Patent Number: 4,631,168
[45] Date of Patent: Dec. 23, 1986

[54] NUCLEAR REACTOR FUEL ASSEMBLY WITH A REMOVABLE TOP NOZZLE

[75] Inventors: John M. Shallenberger, Fox Chapel; Stephen J. Ferlan, Wilkins Township, Allegheny, both of Pa.

[73] Assignee: Westinghouse Electric Corp., Pittsburgh, Pa.

[21] Appl. No.: 644,758

[22] Filed: Aug. 27, 1984

Related U.S. Application Data

[63] Continuation-in-part of Ser. No. 537,775, Sep. 30, 1983, abandoned.

[51] Int. Cl.⁴ .............................................. G21C 3/30
[52] U.S. Cl. .................................... 376/446; 376/449; 376/353
[58] Field of Search .................... 376/446, 449, 353

[56] References Cited

U.S. PATENT DOCUMENTS

| 3,770,583 | 11/1973 | Klumb et al. | |
|---|---|---|---|
| 3,814,667 | 6/1974 | Klumb et al. | |
| 3,828,868 | 8/1974 | Jabsen | |
| 3,992,259 | 11/1976 | Anthony et al. | |
| 4,326,921 | 4/1982 | Cadwell | 376/449 X |
| 4,535,523 | 8/1985 | Leclercq | 376/446 X |

FOREIGN PATENT DOCUMENTS

| 3228380 | 2/1984 | Fed. Rep. of Germany | 376/446 |
|---|---|---|---|
| 2493024 | 4/1982 | France | 376/446 |
| 2529704 | 1/1984 | France | 376/446 |
| 1288610 | 4/1971 | United Kingdom | 376/449 |

Primary Examiner—Deborah L. Kyle
Assistant Examiner—Dan Wasil

[57] ABSTRACT

A nuclear reactor fuel assembly having an improved attaching structure for removably mounting the top nozzle on the upper ends of the control rod guide thimbles. The attaching structure includes an outer socket defined in the adapter plate of the top nozzle, an inner socket formed on the upper ends of the guide thimbles, and a removable locking tube that is inserted in the inner socket to maintain it in locking engagement with the outer socket. The outer socket is in the form of a complement of special shaped bores having an annular groove. The inner socket is in the form of a sleeve having its lower end attached to the upper end of the guide thimble and with its upper end provided with a circumferential bulge which seats in the annular groove. Three elongated slots are provided in the upper end of the sleeve to permit inward elastic collapse of the slotted portion so as to allow the larger bulge diameter to be inserted through the bore of the adapter plate and expansion into the annular groove.

23 Claims, 16 Drawing Figures

NUCLEAR REACTOR FUEL ASSEMBLY WITH A REMOVABLE TOP NOZZLE

CROSS REFERENCE TO RELATED APPLICATION

This application is a continuation-in-part of copending U.S. patent application Ser. No. 537,775, filed 9/30/83 and now abandoned.

Reference is hereby made to the following copending U.S. application dealing with related subject matter and assigned to the assignee of the subject application: "Reconstituting A Nuclear Reactor Fuel Assembly"; by Robert K. Gjertsen et al; assigned U.S. Ser. No. 564,056; and filed 12/21/83 now U.S. Pat. No. 4,572,816.

BACKGROUND OF THE INVENTION

The present invention relates generally to fuel assemblies for nuclear reactors and, more particularly, is directed to an improved attaching structure for removably mounting the top nozzle on the upper ends of the control rod guide thimbles.

In most nuclear reactors the core portion is comprised of a large number of elongated fuel elements or rods grouped in and supported by frameworks referred to as fuel assemblies. The fuel assemblies are generally elongated and receive support and alignment from upper and lower transversely extending core support plates. In the most common configuration, the axis of the core support barrel extends vertically and the various fuel assemblies are also arranged vertically, resting on the lower support plate. Conventional designs of these fuel assemblies include a plurality of fuel rods and control rod guide thimbles held in an organized array by grids spaced along the fuel assembly length and attached to the control rod guide thimbles. Top and bottom nozzles on opposite ends thereof are secured to the control rod guide thimbles in thereby forming an integral fuel assembly. The respective top and bottom nozzles extend slightly above and below the ends of the fuel rods, capturing the rods therebetween.

During operation of such assembly in a nuclear reactor, the fuel rods may occasionally develop cracks along their lengths resulting primarily from internal stresses, thus establishing the possibility that fission products having radioactive characteristics may seep or otherwise pass into the primary coolant of the reactor. Such products may also be released into a flooded reactor cavity during refueling operations or into the coolant circulated through pools where the spent fuel assemblies are stored. Since the fuel rods are part of an integral assembly of guide tubes welded to the top and bottom nozzles, its difficult to detect and remove the failed rods. To gain access to these rods, it is necessary to remove the affected assembly from the nuclear reactor core and then break the welds which secure the nozzles to the control rod guide thimbles. In so doing, the destructive action often renders the fuel assembly unfit for further use in a reactor because of the damage done to both the guide thimbles and the nozzles which prohibits rewelding.

In view of the high costs associated with replacing fuel assemblies, both domestic and foreign utilities indicated an interest in reconstitutable fuel assemblies in order to minimize their operating and maintenance expenses. The nuclear reactor industry responded by providing a reconstitutable fuel assembly with a removable top nozzle. There are different types of these reconstitutable fuel assemblies, but the majority employ a threaded arrangement for attaching the top nozzle to the control rod guide thimbles whereby the top nozzle can be removed to gain access to the fuel rods contained in the skeleton assembly.

One type of such reconstitutable fuel assembly can be seen in the Klumb et al patents (U.S. Pat. No. 3,770,583 or U.S. Pat. No. 3,814,667). Shown is a top nozzle of the type having a hold-down device incorporated therewithin and essentially includes coil springs coaxially disposed about upwardly extending alignment posts that are threaded through an end plate with fastener nuts located on the underside of the plate. An upper hold-down plate is slidably mounted on the alignment posts and the coil springs are interposed, in compression, between the hold-down plate and the end plate. A radially enlarged shoulder on the upper end of the alignment posts retain the hold-down plate on the posts. In an attempt to improve upon the Klumb et al device, Anthony et al set forth another threaded joint arrangement as seen in U.S. Pat. No. 3,992,259. Yet another type of threaded arrangement used for removably attaching the top nozzle on the control rod guide thimbles can be seen in U.S. Pat. No. 3,828,868.

These prior art reconstitutable fuel assemblies employing such threaded arrangements not only suffer from high manufacturing costs, complicated designs, difficlty in removing and reattaching the top nozzle, but, in addition thereto, it has been found that after irradiation, the threaded connection becomes corroded and inoperable, thus requiring some sort of destructive action to the nozzle and/or the guide thimbles resulting in costly damage to these components, yet alone rendering the fuel assembly unfit for further use.

SUMMARY OF THE INVENTION

The present invention provides a fuel assembly with an improved attaching structure for the removably mounting of its top nozzle which overcomes the problems and shortcomings associated with the prior art reconstitutable fuel assemblies employing threaded arrangements for the attachment of the top nozzle. The improved attaching structure of the invention enables the top nozzle to be easily removed from and then reattached to the control rod guide thimbles, without damaging these components whereby the fuel assembly can be reused, in thus minimizing the operating and maintenance expenses of a nuclear reactor.

Accordingly, the present invention sets forth in a fuel assembly having a control rod guide thimble and a top nozzle, an improved attaching structure for removably mounting the top nozzle on the upper end of its guide thimble. More particularly, the improved attaching structure includes an outer socket defined in the top nozzle and an inner socket defined on the upper end of the guide thimble. The inner socket is movable between a compressed releasing position and an expanded locking position. In its compressed releasing position, the inner socket can be removed from and inserted into the outer socket, whereas, in the expanded locking position of the inner socket, the inner and outer sockets are locked together. For retaining the inner socket in its locking position with the outer socket and thereby the attachment of the top nozzle to the guide thimble, a locking member, preferably in the form of an elongated tube, is inserted into the inner socket. Removal of the locking member from the inner socket allows the inner socket to be moved to its releasing position and thereby detachment of the top nozzle from the guide thimble.

In the preferred embodiment of the invention, the outer socket is in the form of a passageway with an annular groove defined in the lower adapter plate of the top nozzle. The inner socket is provided by a sleeve having a circumferential bulge formed on its upper end. The lower end of the sleeve is attached to the upper end of the guide thimble. To allow the bulge on the sleeve to be inserted into and removed from the annular groove of the passageway, an elongated slot has been provided through the bulge and the upper end portion of the sleeve. The elongated slot permits inward elastic collapse of the bulge, and thus, its compressed released position.

The invention further includes means for securing the locking member in its inserted position in the inner socket. In one of different embodiments shown, the locking member securing means takes on the form of a thin wall annular flange on the upper end of the locking member which is deformed into indentations or cavities provided in the top nozzle.

In another of the different embodiments shown, the securing means takes on the form of an upper peripheral edge portion of the locking member being slightly flared outwardly so as to have an outer diameter slightly larger than the inner diameter of the upper end of the passageway defining the outer socket in the lower adapter plate of the top nozzle. Thus, when the locking member is inserted into the passageway a tight friction fit is formed with the upper annular wall portion of the passageway. The securing means also takes the form of a pair of bulges formed into the upper portion of the locking member after insertion into the passageway, which bulges extend into the circumferential groove of the adapter plate defined in the passageway.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
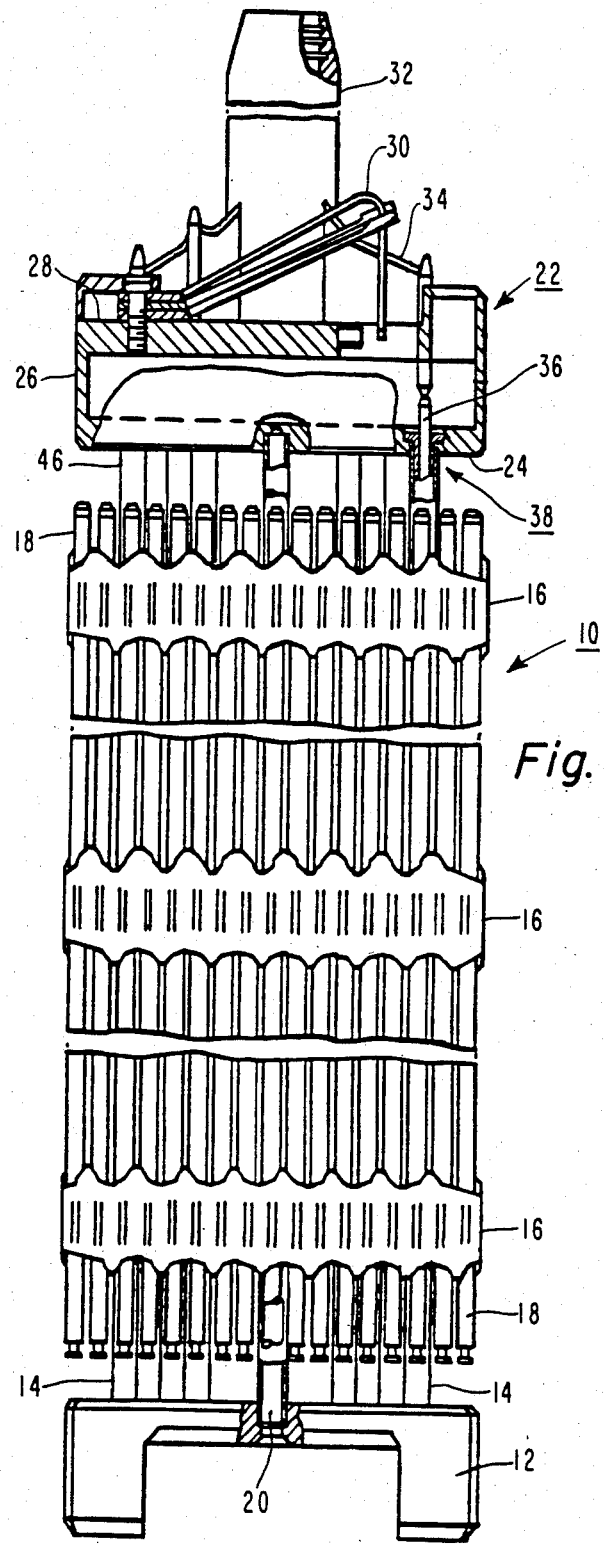
FIG. 1 is a partially sectioned elevational view, with parts being broken away for clarity, of a fuel assembly formed in accordance with the principles of the present invention.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

In General

Referring now to the drawings, and particularly to FIG. 1, there is shown a partially sectioned elevational view, with parts broken away for clarity, of a fuel assembly constructed in accordance with well known practices, being indicated generally by the numeral 10, which incorporates a preferred embodiment of the invention.

The fuel assembly 10 basically comprises a lower end structure or bottom nozzle 12 for supporting the assembly on the lower core plate (not shown) in the core region of a reactor (not shown); a number of longitudinally extending control rod guide tubes or thimbles 14 projecting upwardly from the bottom nozzle 12; a plurality of transverse grids 16 axially spaced along the guide thimbles 14; an organized array of elongated fuel rods 18 transversely spaced and supported by the grids 16; an instrumentation tube 20 located in the center of the assembly; and an upper end structure or top nozzle, generally designated by the numeral 22, attached to the upper ends of the guide thimbles 14, in a manner fully described below, to form an integral assembly capable of being conventionally handled without damaging the assembly components.

The top nozzle 22 includes a transversely extending adapter plate 24 having upstanding sidewalls 26 secured to the peripheral edges thereof in defining an enclosure or housing. An annular flange 28 is secured to the top of sidewalls 26. Suitably clamped to the annular flange 28 are leaf springs 30 (only one of which being shown in FIG. 1) which cooperate with the upper core plate (not shown) in a conventional manner to prevent hydraulic lifting of the fuel assembly caused by upward coolant flow while allowing for changes in fuel assembly length due to core induced thermal expansion and the like. Disposed within the opening defined by the annular flange 28 is a conventional rod cluster control assembly 32 having radially extending flukes 34 being connected to the upper ends of the control rods 36 for vertically moving the control rods in the control rod guide thimbles 14 in a well known manner.

The fuel assembly 10 depicted in the drawings is of the type having a square array of fuel rods 18 with the control rod guide thimbles strategically arranged within the fuel rod array. Further, the bottom nozzle 12 and likewise the top nozzle 22 are generally square in cross section. In that the specific fuel assembly represented in the drawings is for illustrational purposes only, it is to be understood, that neither the shape of the nozzles or the number and configuration of the fuel rods and guide thimbles are to be limiting, and that the invention is equally applicable to different shapes, configurations, and arrangements than the ones specifically shown.

To form the fuel assembly 10, the transverse grids 16 are attached to the longitudinally extending guide thimbles 14 at predetermined axially spaced locations; the fuel rods 18 are inserted through the grids 16; the lower nozzle 12 is suitably attached to the lower ends of the guide thimbles 14; and then the top nozzle 22 is attached to the upper ends of the guide thimbles 14 in the manner fully described below in accordance with the improved attaching structure of the present invention, being generally designated by the numeral 38.

Top Nozzle Attaching Structure

Now while referring to FIGS. 2 through 5, with particular reference to FIGS. 2 and 3, the preferred embodiment of the improved attaching structure 38 for removably mounting the top nozzle 22 on the upper ends of the guide thimbles 14 will be discussed. Although, each of the guide thimbles 14 is attached to the top nozzle 22, the description that follows is directed to the attachment arrangement for only one of the guide thimbles, the other guide thimbles being attached in the same manner. The improved attaching structure 38 basically comprises an inner socket, generally indicated by the numeral 40, defined on the upper end of the guide thimble 14; a outer socket, generally indicated by the numeral 42, defined in the top nozzle 22; and a locking member, generally indicated by the numeral 44, for retaining the inner socket 40 in locking engagement with the outer socket 42 to thereby removably attach the top nozzle 22 on the guide thimbles 14. Each of these three components, the outer socket 40, the inner socket 42, and the locking member 44 which make up the attaching structure 38 will be discussed separately in detail below.

Figure 2:
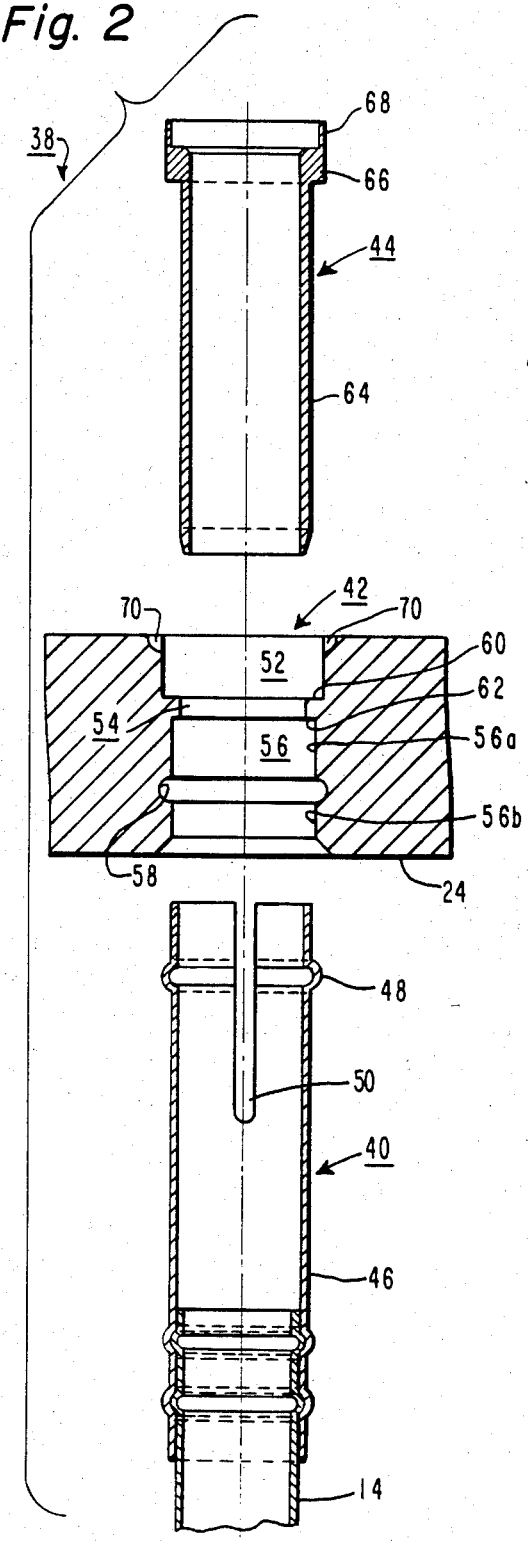
FIG. 2 is a sectioned, exploded view of the components of the improved attaching structure of the present invention before assembly thereof, with a fragmentary portion of the adapter plate of the top nozzle being shown and with the sleeve of the improved attaching structure being seen bulge fitted on the upper end of the control rod guide thimble.
Figure 3:
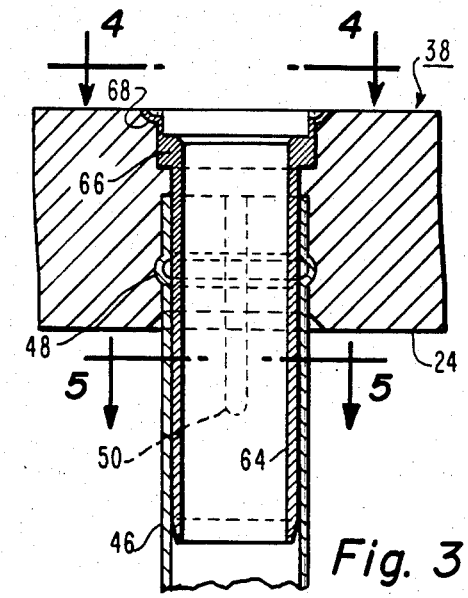
FIG. 3 is the improved attaching structure seen in FIG. 2, but in its assembled position.
Figure 5:
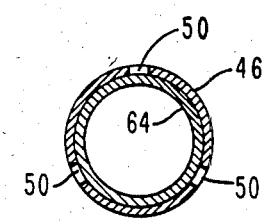
FIG. 5 is a section taken along line 5—5 of FIG. 3 showing the three elongated slots provided in the sleeve.
Figure 4:
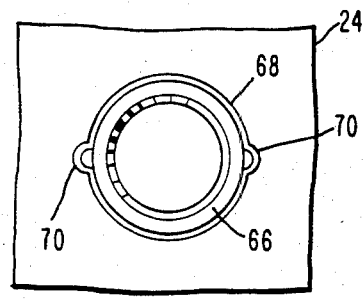
FIG. 4 is a top plan view, as seen by line 4—4 of FIG. 3, looking down on the assembled structure showing the top flange on the locking tube being deformed at two locations into indentations provided in the adapter plate.

As best seen in FIG. 2, the inner socket 40 is preferably in the form of an elongated sleeve 46 having its lower end bulge fitted, in a well known manner, on the upper end of the guide thimble 14. A circumferential bulge 48 is formed on the upper end portion of the sleeve 46 and at least one, and preferably three, (see FIG. 5), elongated slots 50 are provided in the sleeve's upper end portion. The shape of the bulge 48 is in the form of an arc, the purpose of which will become readily apparent later on in the specification. The three elongated slots 50 are equally spaced about the wall of the sleeve and extend axially from the top edge of the sleeve downwardly through and a short distance beyond the bulge 48. The purpose of the slots 50 is to permit inward elastic collapse of the upper end portion of the sleeve 46 (a compressed releasing position) for inserting and removing the inner socket 40 into and from the outer socket 42. It should be noted here, that sleeve 46 may be the sleeve which is commonly attached to the upper grid 16, which in turn is bulge fitted on the upper end of the guide thimble, or, on the other hand, it may be a sleeve separate from the grid sleeve. Further, in accordance with the principles of the present invention, the above described inner socket may be the upper end of the guide thimble itself (without the use of a sleeve) with the circumferential bulge formed on and the elongated slots being provided in the upper end portion of the thimble.

Still referring to FIG. 2, the outer socket 42 is preferably in the form of an axial extending passageway defined in the adapter plate 24 of the top nozzle 22 and is composed of a top bore 52, a middle bore 54, and a lower bore 56, with the lower bore having an annular groove 58 which divides the lower bore 54 into an upper segment 56a (above the groove 58) and a lower segment 56a (below the groove 58). The annular groove 58 is in a form or shape conforming to the arcuate shape of the bulge 48 on sleeve 46. The top bore 52, middle bore 54, and lower bore 56 are all coaxial. The top bore 52 has a diameter greater than the diameter of the middle bore 54 and the diameter of the middle bore 54 is smaller than the diameter of the lower bore 56. Preferably, the diameter of the middle bore 54 is equal to the inner diameter of the sleeve 46, the diameter of the lower bore 56 is equal to the outer diameter of the sleeve 46, and the diameter of annular groove 58 is equal to the outer diameter of the bulge 48 in its expanded locking position. The intersection of the middle bore 54 with the upper bore 52 defines an upper ledge 60 whereas the intersection of the middle bore 54 with the lower bore 56 defines a lower ledge 62, with the width of ledge 62 being approximately equal to the radial thickness of the wall of sleeve 46. The arrangement, size and shape of the bores and annular recess of the outer socket 42 and the size and shape of the upper end portion of sleeve 46 and its bulge 48 (the inner socket 40) is such that when the inner socket 40 is in its expanded locking position within the outer socket 42 (as seen in FIG. 3), the bulge 48 is in mating engagement with the annular groove 58, the top end or edge of sleeve 46 abuts the lower ledge 62, the section of the sleeve above the bulge 48 is in snug contact with the upper segment 56a of lower bore 56, and the section of the sleeve 46 below the bulge 48 is in snug contact with the lower segment 56b of the lower bore 56. The relationship is such as to produce a rigid or tight clearance fit between the inner socket 40 and outer socket 42. It should be noted here that the primary purpose of the lower ledge 62 is to serve as a stop or an alignment guide for proper axial positioning of the sleeve 46 in the passageway when the inner socket 40 is inserted into the outer socket 42.

Again referring to FIG. 2, the attaching structure 38 also includes locking member 44 for retaining the inner socket 40 in its expanded locking position in the outer socket 42. Preferably, locking member 44 is in the form of an elongated tube having a circular body portion 64 and an enlarged radially extending shoulder 66 formed on the upper end of the tube. The outer diameter of the body portion 64 is slightly less than the diameter of the middle bore 54, and likewise the inner diameter of sleeve 46, for snug slidable engagement therethrough in establishing a friction fit therebetween. The outer diameter of the enlarged shoulder 66 is slightly less than the diameter of the top bore 52. In the locking tube's inserted position, as seen in FIG. 3, the shoulder 66 is disposed in the top bore 52 of the adapter plate 24 and rests on the upper ledge 60 while the tubular body portion 64 extends through the middle bore 54 and into the upper end portion of sleeve 46. As readily apparent, the arrangement is such that the locking member 44, in its inserted position, retains the bulge 48 in its expanded locking engagement with the annular groove 58 and prevents it from moving to its compressed releasing position, thus maintaining the inner socket 40 in locking engagement with the outer socket 42, and thereby the attachment of top nozzle 22 on the upper ends of guide thimbles 14.

Due to vibration forces and the like, the improved attaching structue 38 further includes means for securing the locking member 44 in its inserted position in the inner socket 40. As seen in FIG. 2, in the preferred embodiment, the securing means takes on the form of an upstanding, thin wall, circular flange 68 formed on the upper edge of shoulder 66 of locking member 44 which is deformable into indentations or cavities 70 provided in the adapter plate 24, adjacent the top bore 52 (see FIGS. 3 and 4).

Briefly, while referring to FIGS. 2 and 3, the attachment and detachment of the top nozzle 22 on the guide thimbles 14 is as follows: The upper end portion of sleeve 46 is moved to its compressed releasing position (inward elastic collapse of bulge 48) and inserted into the lower bore 56 whereupon the end portion moves to its expanded locking position with the bulge 48 being seated in the annular groove 58. The locking member 44 is then inserted into the inner socket 40 to maintain the bulge 48 in locking engagement with the groove 58. And then the flange 68 is deformed into the indentations 70. As an alternative attachment operation, the inner socket 40, outer socket 42 and locking member 44 are assembled together as described above as a subassembly and then the lower end of the sleeve 46 is bulge expanded on the upper end of the guide thimble 14. For detachment, the locking member 44 is rotated to override the securing engagement of the flange 68 in the indentations 70 and then the locking member 44 is removed from its inserted position. Now the adapter plate 24 is lifted up which forces inward elastic collapse of the upper end portion of sleeve 46 to its compressed released position to thereby allow the bulge 48 to pass through the lower segment 56b of lower bore 56.

Figure 6:
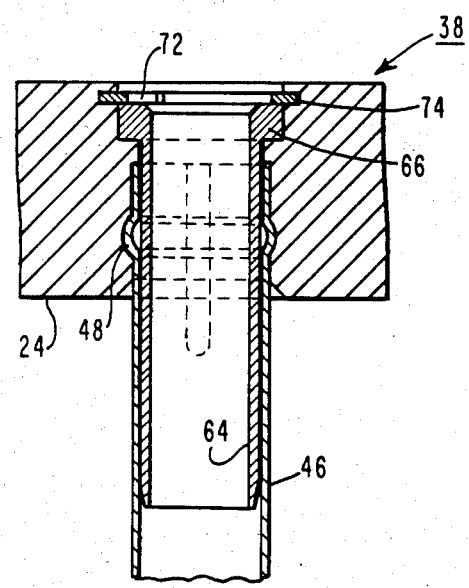
FIG. 6, is similar to FIG. 3, but shows an alternative embodiment of the means for securing the locking tube in its inserted position. The securing means being represented in this view by a split retainer ring.
Figure 7:
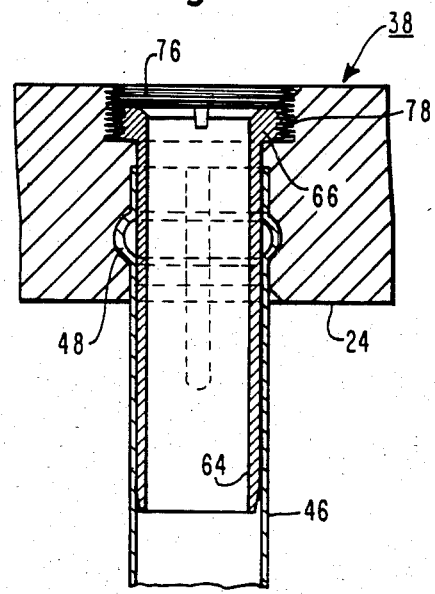
FIG. 7 is another alternative embodiment of the locking tube securing means, showing external threads on the enlarged shoulder of the locking tube that threadably engage the internal threads provided in the top bore.
Figure 8:
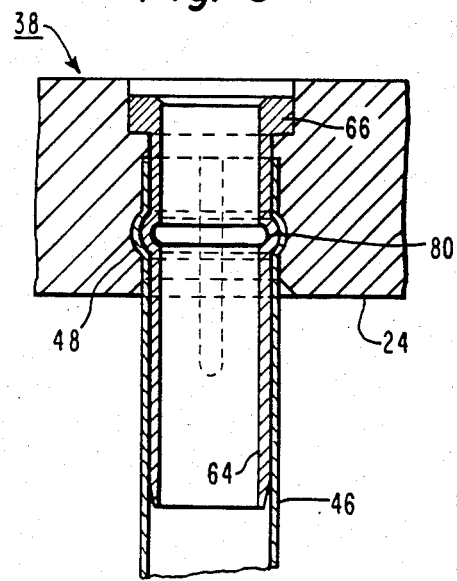
FIG. 8 is yet another alternative embodiment of the locking tube securing means, showing the locking tube being bulge expanded into the bulge cavity of the sleeve.
Figure 9:
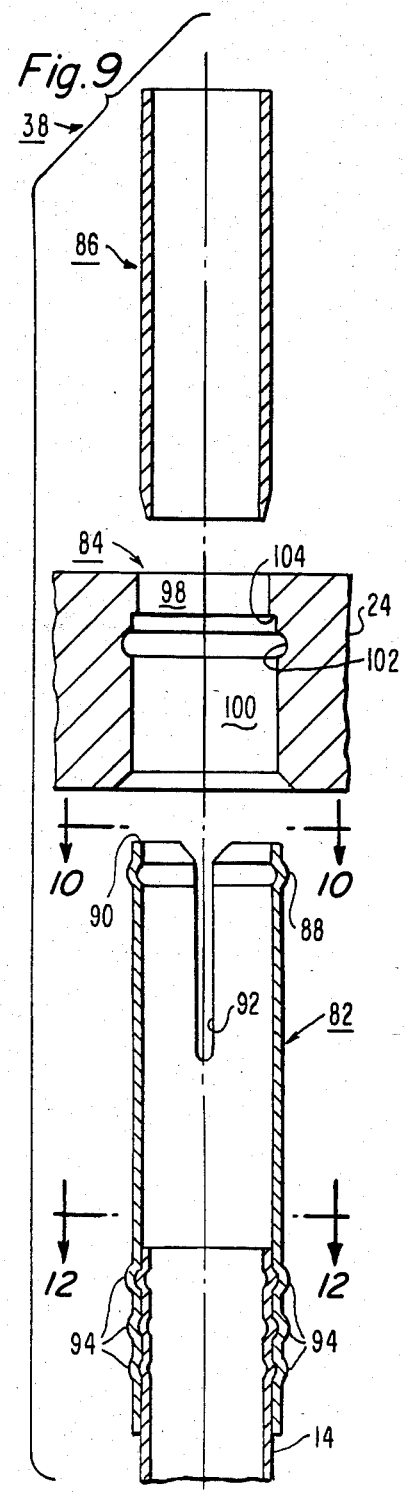
FIG. 9 is similar to FIG. 2, but shows still another alternative embodiment of the components making up the improved attaching structure of the present invention.
Figure 10:
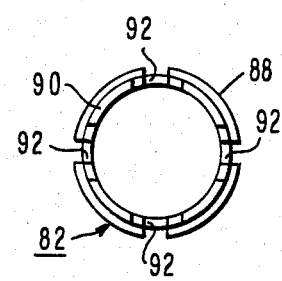
FIG. 10 is a top plan view, as seen by line 10—10 of FIG. 9, looking down on the top of the sleeve mounted on the upper end of the control rod guide thimble.

FIGS. 6, 7 and 8 each show an alternative embodiment of the improved attaching structure 38 of the present invention. Each of these alternative embodiments are substantially identical to the preferred embodiment seen in FIGS. 2 and 3, except for the form of the securing means to retain the locking member 44 in its inserted position within the inner socket 40. In the alternative embodiment seen in FIG. 6, the securing means is in the form of a split snap ring 72 disposed within an annular recess 74 in the top bore 52 of adapter plate 24. The ring 72 engages the top surface of shoulder 66 to prevent the locking member 44 from moving vertically upwardly out of its inserted position. In FIG. 7, the securing means is represented in the form of external threads 76 on the outer lateral surface of shoulder 66 which threadably engage internal threads 78 provided on the wall of the top bore 52. And in the alternative embodiment shown in FIG. 8, the securing means takes on the form of the body portion 64 of the locking member 44 being bulge fitted or expanded, at the location indicated by numeral 80, into the cavity formed by the bulge 48 of sleeve 46.

FIGS. 9 to 15 show still another alternative embodiment of the improved attaching structure of the present invention. Unlike each of the alternative embodiments of FIGS. 6, 7 and 8 which differed only from the preferred embodiment of FIGS. 2 and 3 in the form of the securing means of the locking member, the alternative embodiment of FIGS. 9 to 15 differs somewhat from the preferred embodiment in each part of the attaching structure: the sleeve or inner socket, generally indicated by the numeral 82, defined on the upper end of the guide thimble 14; the outer socket, generally indicated by the numeral 84, defined in the top nozzle 22; and the locking member, generally indicated by the numeral 86, for retaining the inner socket 82 in locking engagement with the outer socket 84 to thereby removably attach the top nozzle 22 on the guide thimbles 14. The areas in which each of these three parts of the alternative embodiment of FIGS. 9 to 15 differ from those of the preferred embodiment will be discussed separately in detail below.

Figure 11:
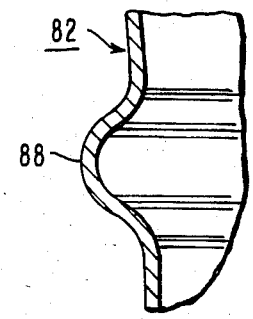
FIG. 11 is an enlarged view of a fragmentary portion of the upper end of a sleeve similar to the sleeve of the improved attaching structure seen in FIG. 9, but having a slightly outwardly flared upper end above the circumferential bulge.
Figure 12:
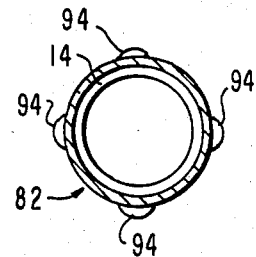
FIG. 12 is a section taken along line 12—12 in FIG. 9 showing the bulge fittings at four circumferential locations of the lower end of the sleeve and the upper end of the control rod guide thimble.
Figure 16:
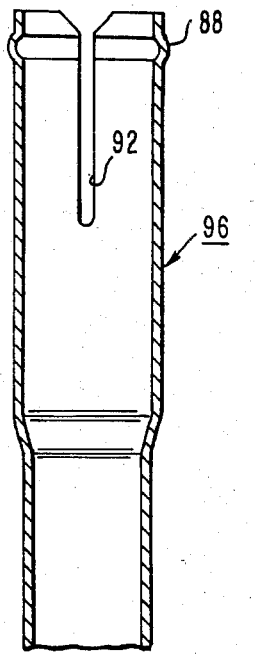
FIG. 16 is a sectional view of an alternative embodiment wherein the guide thimble and extension sleeve are made of one piece construction.

The inner socket 82 has a circumferential bulge 88 formed on its upper end portion only a short distance below its upper edge 90. Also, there are preferably four (instead of three) elongated slots 92 (see FIG. 10) provided in the upper end portion of the inner socket 82. Further, the inner socket 82 has its lower end portion bulge fitted at three axially spaced regions to the guide thimble with four bulges 94 circumferentially displaced approximately ninety degrees from one another at each of the three regions. However, with respect to the latter, it is clear from the modified form of the inner socket 96, shown in FIG. 16, the inner socket and upper end portion of the guide thimble 14 could be a single integral structure. This also applies to the inner socket 40 in FIGS. 2 and 3 as well as in FIGS. 6, 7 and 8. Finally, with respect to the inner socket, FIG. 11 illustrates a slightly modified configuration for the inner socket 82 from that seen in FIGS. 9 and 14 in that the upper end 98 is slightly outwardly flared (for instance 4–5 degrees) above the circumferential bulge 88.

Figure 14:
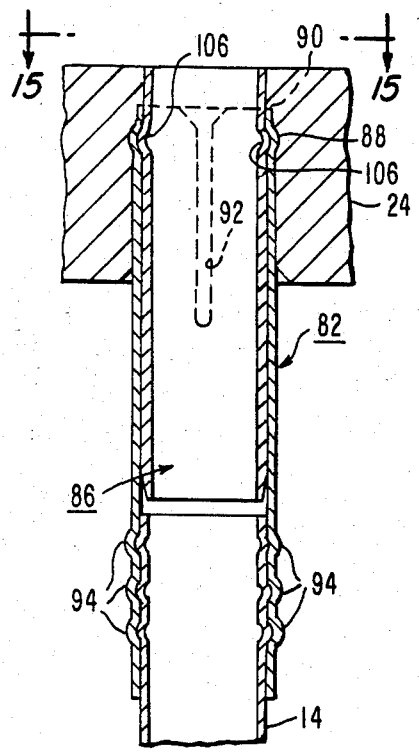
FIG. 14 is a sectional view of the improved attaching structure of FIG. 9, showing the components in assembled position.

The outer socket 84 preferably in the form of an axial extending passageway defined in the adapter plate 24 of the top nozzle 22 is composed of an upper bore 98 and a lower bore 100. The lower bore 100 is of considerable greater axial length than the upper bore 98 and has an annular groove 102 which is spaced a short distance below a ledge 104 formed at the intersection of the upper and lower bores 98,100. The lower bore 100 has a diameter which is greater than that of the upper bore 98; therefore, the ledge 104 faces in a downward direction. The primary purpose of the ledge 104 is to serve as a stop or an alignment guide for proper axial positioning of the sleeve or inner socket 82 in the passageway when the inner socket is inserted into the outer socket 84. As seen in FIG. 14, the upper edge 90 abuts the ledge 104.

Figure 13:
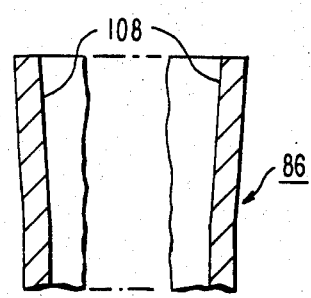
FIG. 13 is an enlarged fragmentary view of the upper end of the locking member of the improved attaching structure seen in FIG. 9, showing a slightly outwardly tapered or flared upper peripheral edge portion thereof.
Figure 15:
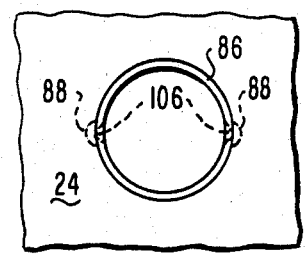
FIG. 15 is a top plan view, as seen by line 15—15 of FIG. 14, showing a pair of bulge fittings in the locking tube of the improved attaching structure of FIG. 14.

Finally, the securing means of the locking member 86 takes the form of a pair of bulges 106 (see FIG. 15) formed into the upper portion of the locking member 86 after insertion into the passageway. The bulges 106 fit into the circumferential groove 88 in the adapter plate passageway or outer socket 84. Also, as seen in FIG. 13, the securing means further includes a slightly outwardly flared (for instance 1–2 degrees) upper peripheral edge portion 108 of the locking member 86. The outer diameter of the upper edge portion 108 of the locking member 86 is slightly larger than the diameter of the upper bore 98. Thus, when the locking member 86 is inserted into the passageway, a tight friction fit is formed with the adapter plate within the upper bore 98.

It is thought that the invention and many of its attendant advantages will be understood from the foregoing description and it will be apparent that various changes may be made in form, construction and arrangement thereof without departing from the spirit and scope of the invention or sacrificing all of its material advantages, the form hereinbefore described being merely a preferred or exemplary embodiment thereof.

We claim:

1. In a fuel assembly having at least one control rod guide thimble and a top nozzle, said top nozzle including a transversely extending adapter plate, an improved attaching structure for removably mounting the top nozzle on the guide thimble comprising:
   (a) means defining an outer socket in the top nozzle, said outer socket defining means including a passageway extending through said adapter plate and having a first mating element defined in said adapter plate within said passageway;
   (b) means on an upper end of said guide thimble defining an inner socket, said inner socket defining means including an elongated sleeve having an upper end portion, said upper end portion of said sleeve having a second mating element formed thereon and at least one elongated axial slot defined therein for permitting radial movement of said sleeve upper end portion between a compressed releasing position for removing and inserting said inner socket from and into said outer socket and an expanded locking position for locking said inner and outer sockets together and correspondingly permitting inward elastic collapse of said second mating element so as to allow said second mating element to enter and exit said passageway and outward elastic expansion of said second mating element so as to allow said second mating element to expand and mate with said first mating element; and
   (c) a locking member inserted into said inner socket for retaining said inner socket in its locking position and thereby attachment of said top nozzle to said guide thimble, said locking member being removable from said inner socket for allowing said inner socket to be moved to its compressed releasing position and thereby detachment of said top nozzle from said guide thimble, said locking member including an elongated body portion having an outer diameter substantially equal to the inner diameter of said elongated sleeve for allowing snug fitting slidable nonthreading engagement of said locking member relative to said sleeve to a locking relation in which said locking member body portion extends through said sleeve upper end portion above and below said second mating element formed in said sleeve and through said passageway of said adapter plate.

2. The fuel assembly as defined in claim 1, wherein said elongated sleeve of said inner socket defining means has a lower end being attached on the upper end of said guide thimble.

3. The fuel assembly as defined in claim 1, wherein said first mating element is an annular groove formed in said adapter plate within said passageway.

4. The fuel assembly as defined in claim 3, wherein said second mating element in said upper end portion of said sleeve is a circumferential bulge which seats in said annular groove when said inner socket is in its expanded locking position within said outer socket.

5. The fuel assembly as defined in claim 4, wherein said at least one slot in said sleeve upper end portion extends downward from a top end of said sleeve through said bulge for permitting inward elastic collapse of said upper end portion and said bulge so as to allow said bulge to enter said passageway and expand into said annular groove.

6. The fuel assembly as defined in claim 4, wherein the shape of said circumferential bulge conforms to the shape defined by said annular groove for mating engagement therebetween.

7. The fuel assembly as defined in claim 6, wherein the shape of said circumferential bulge is in the form of an arc.

8. The fuel assembly as defined in claim 1, wherein said locking member has an enlarged shoulder formed on an upper end of said body portion for supporting said body portion within said passageway and retaining said inner socket in locking engagement with said outer socket.

9. The fuel assembly as defined in claim 1, wherein said passageway is composed of an upper bore, a coaxial middle bore of a smaller diameter than said upper bore, and a coaxial lower bore of a larger diameter than said middle bore and with said annular groove dividing said lower bore into an upper segment and a lower segment, the intersection of said middle bore with said upper bore forming an upper ledge and the intersection of said middle bore with said lower bore forming a lower ledge.

10. The fuel assembly as defined in claim 9, wherein said locking member has an enlarged shoulder formed on an upper end of its body portion, said enlarged shoulder being disposed within said upper bore and restably supported on said upper ledge when said body portion is in its locking relation in said sleeve.

11. The fuel assembly as defined in claim 10, wherein said enlarged shoulder is circular having an outer diameter slightly less than the diameter of said top bore.

12. The fuel assembly as defined in claim 9, wherein the width of said lower ledge is substantially equal to the radial thickness of the wall of said sleeve.

13. The fuel assembly as defined in claim 12, wherein the diameter of said middle bore is equal to the inner diameter of said sleeve and slightly greater than the outer diameter of said body portion of said locking member for providing a snug slidable fit between said locking member body portion and said middle bore and said sleeve when said locking member body portion is in its locking relation in said sleeve.

14. The fuel assembly as defined in claim 12, wherein the top edge of said sleeve abuts said lower ledge when said upper end portion of said sleeve is in its expanded locking position in said lower bore.

15. The fuel assembly as defined in claim 9, wherein said second mating element formed on said upper end portion of said sleeve divides said upper end portion into an upper section above said second mating element and a lower section below said second mating element, said upper and lower sections being in snug contact with said respective upper and lower segments of said lower bore when said second mating element is in its expanded locking position within said first mating element.

16. The fuel assembly as defined in claim 1, further including means for securing said locking member in its inserted position in said inner socket to thereby prevent axial movement of said locking member.

17. The fuel assembly as defined in claim 16, wherein said securing means includes a flange mounted on an upper end of said locking member and a cavity defined in said top nozzle, said flange being deformed into engagement with said cavity.

18. The fuel assembly as defined in claim 16, wherein said securing means includes an annular recess defined in said top nozzle and a split retainer ring being disposed in said recess for retaining engagement with an upper end of said locking member.

19. The fuel assembly as defined in claim 16, wherein said securing means includes a circumferential bulge formed on said locking member which retainably engages said inner socket.

20. The fuel assembly as defined in claim 4, wherein said passageway is composed of an upper bore and a lower bore, said lower bore having a larger diameter than said upper bore such that the intersection of said bores forms a ledge against which an upper edge of said elongated sleeve abuts when said circumferential bulge thereof seats in said annular groove.

21. The fuel assembly as defined in claim 20, wherein said annular groove of said passageway is formed in said lower bore.

22. The fuel assembly as defined in claim 4, wherein said means for securing said locking member in its inserted position in said sleeve takes the form of at least one bulge formed in said locking member and extending into said circumferential bulge of said sleeve after said locking member is inserted into said sleeve.

23. The fuel assembly as defined in claim 4, wherein:
said passageway includes an upper bore; and
said means for securing said locking member in said sleeve takes the form of an upper peripheral edge portion on said locking member having an outer diameter slightly greater than the diameter of said upper bore so as to provide a frictional fit therewith when said locking member is in its inserted position.

* * * * *